Figure 1:
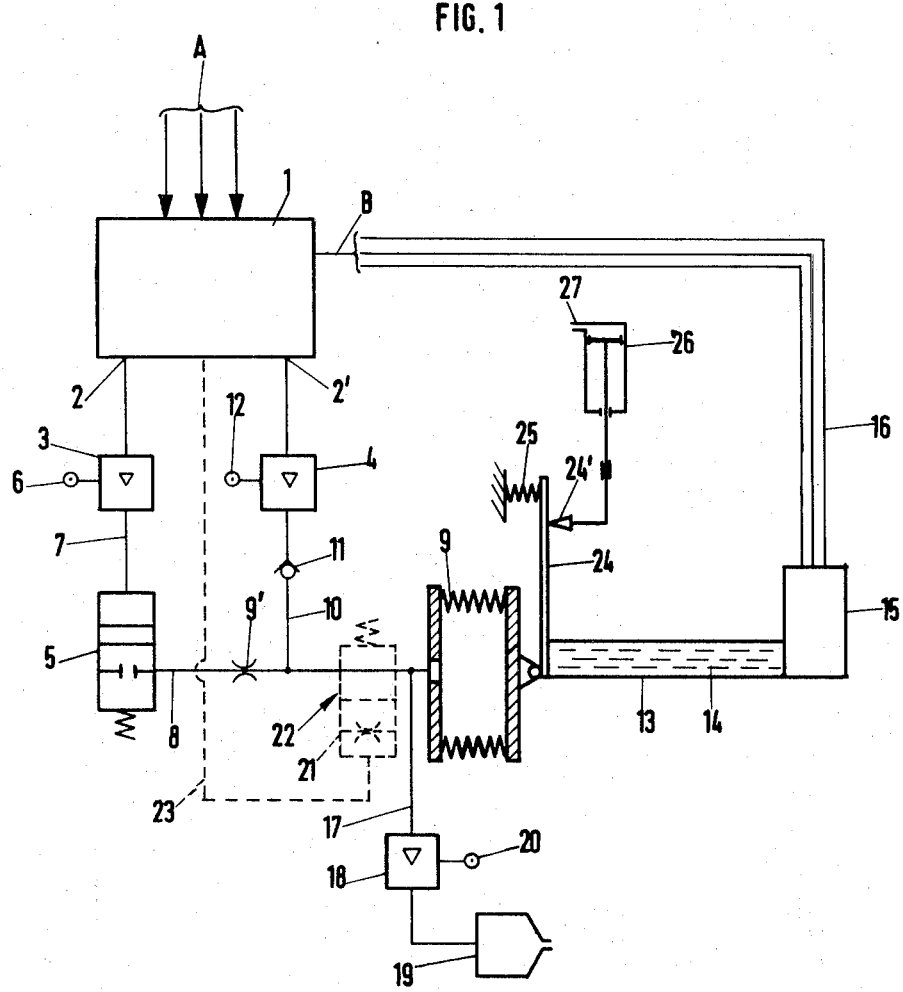

United States Patent [19]
Würth

[11] 3,871,718
[45] Mar. 18, 1975

[54] BRAKE CONTROL DEVICE FOR RAILWAY VEHICLES

[75] Inventor: Hans-Jörg Würth, Lohhof, Germany

[73] Assignee: Knorr-Bremse GmbH, Munich, Germany

[22] Filed: Apr. 9, 1974

[21] Appl. No.: 459,397

[30] Foreign Application Priority Data
Apr. 12, 1973 Germany............................ 2318499

[52] U.S. Cl................................. 303/22 R, 303/20
[51] Int. Cl................................................. B60t 8/20
[58] Field of Search.................... 303/10, 11, 15–17, 303/20, 21 R, 21 B, 21 A, 22 R, 59

[56] References Cited
UNITED STATES PATENTS

| | | |
|---|---|---|
| 3,689,121 | 9/1972 | Kawabe et al................. 303/22 R X |
| 3,718,375 | 2/1973 | Bowler et al...................... 303/21 B |
| 3,761,137 | 9/1973 | Green et al. .................. 303/22 R X |
| 3,802,745 | 4/1974 | Strifler et al................. 303/22 R X |

*Primary Examiner*—Duane A. Reger
*Attorney, Agent, or Firm*—Edmund M. Jaskiewicz

[57] ABSTRACT

A brake control device includes a bellows or the like for measuring the pressure in the brake cylinder and a coded device which generates actual value signals corresponding to the measured pressure. These actual value signals together with control signals as reference value signals corresponding to a selected braking stage are introduced into a logic comparator. An output signal is generated from the comparator to control at least two solenoid valves for introducing air into the brake cylinder and for venting the brake cylinder in accordance with a selected braking stage.

5 Claims, 2 Drawing Figures

BRAKE CONTROL DEVICE FOR RAILWAY VEHICLES

The present invention relates to a brake control device such as for railway vehicles and the like, more particularly, to such a device for regulating the air in a brake cylinder in response to the desired braking stage and to the measured pressure in the brake cylinder.

It is known to provide a brake control device, particularly for railway vehicles, in which there is a brake cylinder that can be subjected to the action of a pressure medium in selected stages of braking together with an adjustable control for selecting a particular braking stage. Such a device also comprises a number of control lines dependent upon the number of braking stages for transmitting control signals corresponding to the selected braking stages for controlling solenoid valves to regulate the pressure medium in the brake cylinder. For this purpose a line is generally provided for introducing pressure medium to the cylinder and for venting the cylinder.

A particular form of such a brake control device comprises a number of solenoid valves corresponding to a particular number of braking stages with a particular combination of valves being selected to introduce a pressure medium to act on particular annular surfaces of a control piston. The control piston regulates the pressure in the braking cylinder by means of at least one control valve. Such brake control devices are generally expensive since $n$ solenoid valves are required for $2^n$ stages, namely, three solenoid valves are required in the case of eight stages of braking, inclusive of stage 0.

The corresponding control system with three annular surfaces each of which can be subjected individually to the action of the pressure medium requires a considerable amount of space and is particularly expensive with respect to the sealing of the annular surfaces.

It is therefore the principal object of the present invention to provide a novel and improved brake control device of the type described above.

It is another object of the present invention to provide such a brake control device which is simple in structure, requires less space and eliminates expensive sealing problems with respect to the pressure medium.

According to one aspect of the present invention a brake control device for railway vehicles and the like may include a brake cylinder which is responsive to a pressure medium in selected stages of braking. In addition, there is adjustable means indicative of a selected braking stage for generating control signals as reference signals corresponding to a selected braking stage. The pressure in the brake cylinder is sensed by suitable means which may include a bellows, a pressure cell or the like. A coded member in the form of a disk or rod is moved in response to the sensed pressure with respect to a scanner which generates actual value signals. The actual value signals and the reference value signals are introduced into a comparator which generates an output signal indicative of the comparison. The output signal is transmitted to means including solenoid valves responsive to the output signal for regulating the pressure medium in the brake cylinder in accordance with a selected braking stage by introducing pressure medium into the cylinder and by venting the cylinder.

Figure 2:
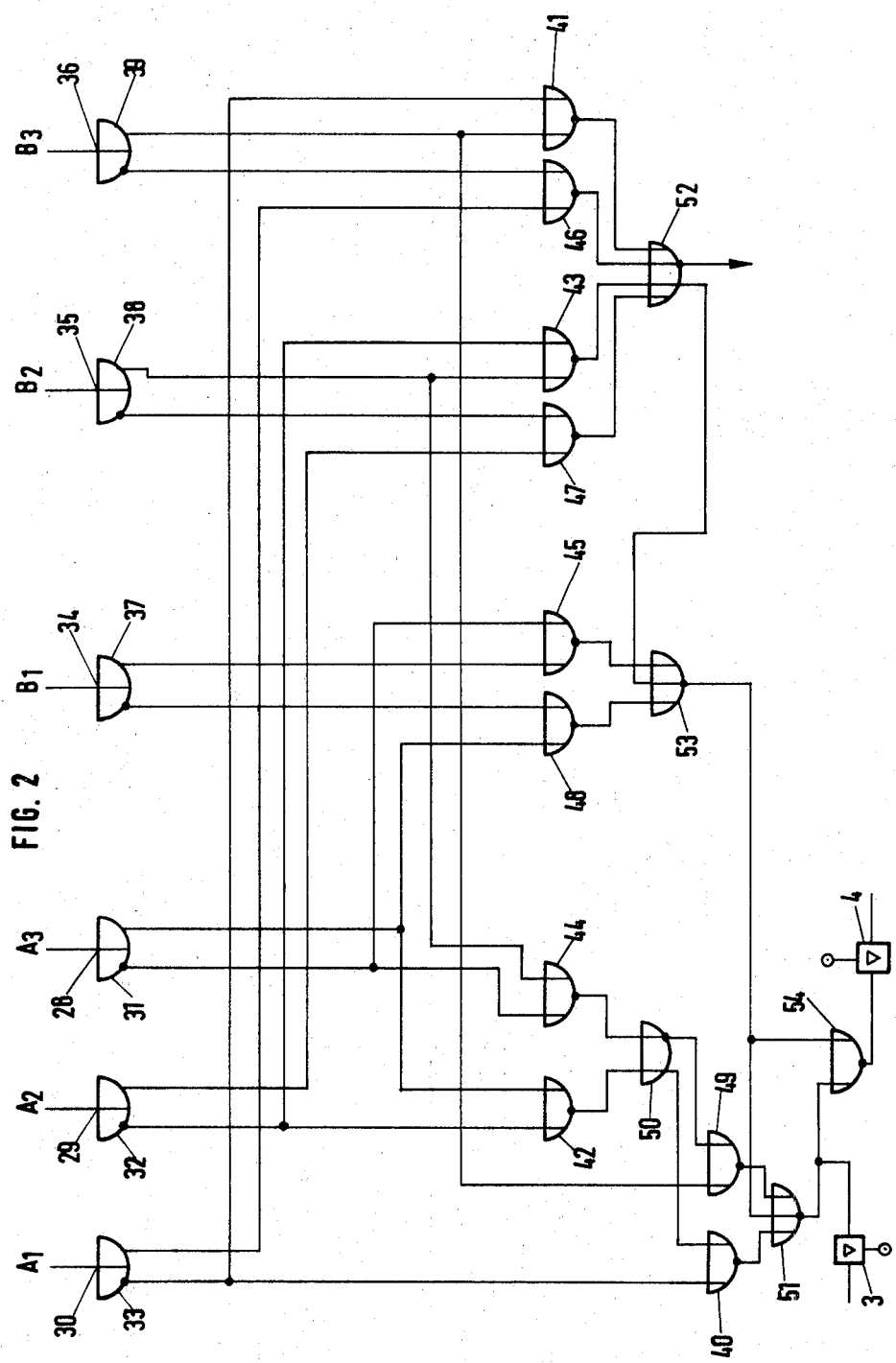

Other objects and advantages of the present invention will be apparent upon reference to the accompanying description when taken in conjunction with the following drawings, which are exemplary, wherein;

FIG. 1 shows schematically a brake control device according to the present invention; and FIG. 2 is an electrical circuit diagram of the comparator employed in the device of FIG. 1.

Proceeding next to the drawings wherein like reference symbols indicate the same parts throughout the various views a specific embodiment and modifications of the present invention will be described in detail.

In FIG. 1 there is shown a comparator 1 which receives coded control signals A from an operator's control device which indicates the particular stage or step of braking desired. The signals A represent reference value signals which are compared with suitably coded actual value signals in a manner to be presently described. The comparator 1 is shown in greater detail in FIG. 2.

Comparator 1 has outputs 2 and 2' which are respectively connected to solenoid valves 3 and 4. A signal to open solenoid valve 3 is transmitted at output 2 of the comparator when the actual value is greater than the reference value. A signal for opening solenoid valve 4 is transmitted at output 2' of the comparator when the actual value is smaller thant the reference value.

The solenoid valve 3 controls a shut-off valve 5 which is normally held in its blocking or shut-off position when the solenoid valve is closed. When solenoid valve 3 is opened, the shut-off valve 5 will be shifted into its open position against a spring force and a source of pressure medium 6 is connected to conduit 7. When valve 3 is closed, the pipe 7 is vented to the atmosphere. The shut-off valve 5 is connected through a pipe 8 to a pressure bellows 9. When shut-off valve 5 is opened, pressure medium is able to escape from the pressure bellows 9 through pipe 8 and shut-off valve 5. A suitable throttle 9' may be connected in line 8 through which the pressure medium can be throttled as it is vented from the pressure bellows 9.

A pipe 10 branches off from pipe 8 and is connected through a check valve 11 to solenoid valve 4. When valve 4 is opened, a source of pressure medium 12 is connected to pipe 10 to enable the pressure medium to reach the bellows 9. In response to this admittance of pressure medium, the pressure bellows 9 will shift a coded disk 13 having etched slots 14 thereon with respect to a stationary scanning device 15. The code on the disk 13 corresponds to the code of the reference value signals A. The scanner 15 can scan slots 14 of code disk 13 by means of photodiodes to generate a digital actual value corresponding to the particular pressure in the pressure bellows 9. The actual value signals are transmitted through line 16 to an input of comparator 1.

A pipe branches off from pipe 8 and is connected through an amplifier 18 to a final element 19 which is actuated by pressure medium which in this particular embodiment is a brake cylinder of the air brake system of a vehicle. A source of pressure medium 20 can be connected by amplifier 18 in order to act on the brake cylinder 19. The pressure in the cylinder 19 will correspond to the control pressure in the bellows 9.

Upon actuation of the control device to generate reference signals corresponding to a desired braking stage, if the pressure in bellows 9 is too low with respect to this braking stage the actual value signal B will be greater than the reference value signal A. As a result, a signal is transmitted to open solenoid valve 3 which is turn actuates shut-off valve 5. The pressure medium will then escape from the bellows 9 until the digital actual value scanned by the scanning device 15 and released to the comparator through line 16 corresponds to the preselected reference value.

If the pressure in the bellows 9 is too high, solenoid valve 3 will remain closed and the comparator will release a signal to solenoid valve 4 which will connect pressure source 12 through check valve 11 and pipes 10 and 8 to the pressure bellows 9. The pressure in the bellows 9 will thus be increased until the scanning device 15 releases an actual value signal which corresponds to the reference value signal.

In order to avoid oscillation of the control circuit about its reference value position, the comparator is preferably so constructed that a particular difference between the reference and actual values a throttle 21 (indicated in dash lines in FIG. 1) may be connected in a solenoid valve 22 that is connected to comparator 1 through a pipe 23. This will enable the pressure medium to be introduced into the bellows or venting to be accomplished by throttling in a particular manner. As a result, the actual pressure will not oscillate or at least will not swing substantially beyond the desired reference pressure.

The comparator will generate a signal to actuate solenoid valve 22 so that throttle 21 is connected into pipe 8. Upon termination of this comparator signal, solenoid valve 22 will return automatically into its normal or starting position wherein pipe 8 is connected to the pressure bellows 9 across its full cross-section.

The pressure bellows 9 exerts a force on code disk 13 through one end of a lever 24 whose other end rests upon a spring 25. The lever 24 is provided with a fulcrum 24' which is displaceable by means of a piston 26 in order to vary the transmission ratio. The piston 26 is connected through pipe 27 to a control pressure.

When this device is installed in an air brake system for a vehicle, the control pressure may be responsive to the load on the vehicle.

The bellows 9 functions to measure or sense the pressure in the brake cylinder 19.

Similar devices including a servo-piston, a pressure cell or transducer or similar device may be employed in place of the pressure bellows 9. In addition, the lever or linkage arrangement for the transmission or reduction of the force transmitted by bellows 9 to the code disk 13 may also employ other structures performing the same function.

A signal or indication transmitted by the pressure measuring device, in this embodiment bellows 9, which controls the coding device can thus be varied as a function of the load upon the vehicle by displacing the fulcrum of the lever or in some other manner varying the transmission ratio.

The coded disk 13 may employ a Gray code or a Binary Reflective code. The scanner 15 scans the code markings on the disk or member and the markings in this embodiment are slots. The scanner 15 may operate through photoelectric or fluid means. Photoelectric scanning may be used when an electric comparator is used as in the present invention. When fluid scanning is employed in conjunction with an electric comparator, the fluid actual value signals must be converted into electrical actual value signals. Inversely, the electric actual value signals of the photoelectric scanning device must be converted into fluid signals in the case of a fluid comparator. It is also possible to employ mechanical scanning of the code disk. The code disk can be displaced by the bellows 9 or other pressure measuring device along its axis or rotated about an axis. It is apparent that the code with which the actual value signals are coded must correspond to the code in which the reference value signals are coded.

In the comparator as shown in detail in FIG. 2, the reference value signal comprises a 3-bit signal $A_1$, $A_2$, $A_3$. These bits are located in the sequence of their positions at inputs 28, 29, 30 or 3 OR/NOR elements 31, 32, 33.

The actual value signal comprises in a corresponding manner a 3-bit signal $B_1$, $B_2$, $B_3$. The bits of the actual value signal are located in the sequence of their positions at inputs 34, 35, 36 of OR/NOR elements 37, 38, 39. OR/NOR elements 31, 32, 33 are connected with their NOR outputs to the respective first inputs of OR/NOR elements 40, 41, 42, 43 and 44, 45. The OR outputs of OR/NOR elements 31, 32, 33 are connected respectively to the first inputs of OR/NOR elements 46, 47, 48. In addition the OR output of OR/NOR element 31 is connected to the second input of OR/NOR 42. The NOR outputs of OR/NOR elements 37, 38, 39 are connected respectively to second inputs of OR/NOR elements 46, 47, 48 and the OR outputs of OR/NOR elements 38, 39 are connected respectively to first and second inputs of OR/NOR elements 41, 49 and 43, 44.

The OR output of OR/NOR element 37 is led to the second input of OR/NOR element 45. The outputs of OR/NOR elements 42, 44 are connected to the two inputs of an OR/NOR element 50.

The NOR output of OR/NOR element 50 is led to the second input of OR/NOR element 40.

The outputs of OR/NOR elements 40, 49 are led to two of three inputs of an OR/NOR circuit 51.

The outputs of OR/NOR elements 47, 43, 46, 41 are led to the four inputs of OR/NOR circuit 52.

Signals for switching or control of solenoid valve 22 of FIG. 1 appear on NOR output of OR/NOR circuit 52.

The OR/output of OR/NOR circuit 52 is led to one of three inputs of an OR/NOR circuit 53. The two other inputs of OR/NOR circuit 53 are connected to the outputs of OR/NOR elements 48, 45. The NOR/output of OR/NOR circuit 53 is connected to the third input of OR/NOR circuit 51 and to the first input of an OR/NOR element 54.

The NOR/output of OR/NOR element 51 is connected to the second input of OR/NOR element 54 and to solenoid valve 3 (FIG. 1). The NOR/output of OR/NOR element 54 is led to solenoid valve 4 (FIG. 1).

OR/NOR elements 37, 38, 39, 41, 46, 43, 47, 45 and 48 together with OR/NOR circuits 52 and 53, form a coincidence circuit while remaining OR/NOR elements 31,32,33,42,44,55,40,49,51 and 54 form a comparator circuit. An output signal appears at the NOR output of OR/NOR element 51, when the actual value $\geq$ reference value. An output signal appears at the NOR output of OR/NOR element 54 when the actual value < than the reference value. If the coincidence circuit determines that the reference value equals the actual values, NOR output of OR/NOR circuit 53 releases a signal to the third input of OR/NOR circuit 51 and to an input of OR/NOR element 54, so that no signal appears at the two NOR outputs of OR/NOR circuit 51 of element 54.

Accordingly, although the actual value signals ≧ reference value or actual value < reference value may be present at the output of the comparator circuit, both signals are suppressed when the signal indicating actual value = reference value is released by the coincidence circuit. Accordingly, the appearance of a signal on solenoid valve 3 means that the actual value is greater than the reference value and the appearance of a signal on solenoid valve 4 means that the reference value is smaller than the actual value. When no signal appears either on solenoid valve 4 or solenoid valve 3, the actual value equals the reference value.

The coincidence circuit is constructed here in such a manner that a slow or gradual motion is switched on for connecting throttle 21 into pipe 8, in the case of correspondence of the two stages $A_2 = B_2$ and $A_3 = B_3$.

As described above, both the reference and actual value signals may be coded in a Binary Reflected code. It is also to be borne in mind that comparators other than the particular embodiment disclosed herein may be employed in this invention.

It is therefore apparent that the present invention has disclosed a brake control device which precisely and accurately controls the braking action on a vehicle in accordance with a braking stage as selected or determined by the operator of the vehicle. While the embodiment has been disclosed in connection with a braking system it is to be understood that various other forms of elements can be controlled by the device according to the present invention.

It will be understood that this invention is susceptible to modification in order to adapt it to different usages and conditions, and accordingly, it is desired to comprehend such modifications within this invention as may fall within the scope of the appended claims.

What is claimed is:

1. In a brake control apparatus for railway vehicles and the like, the combination of a brake cylinder responsive to a pressure medium is selected stages of braking, adjustable means indicative of a selected braking stage for generating control signals as reference signals corresponding to a selected braking stage, means for sensing the pressure in the brake cylinder, means responsive to said pressure sensing means for generating actual value signals, means receiving said actual value signals and said reference value signals for comparing said signals and generating an output signal indicative of said comparison and means including solenoid valves responsive to said output signals for regulating the pressure medium in the brake cylinder in accordance with a selected braking stage by introducing pressure medium into the cylinder and by venting the cylinder.

2. In a brake control apparatus as claimed in claim 1 wherein said pressure sensing means comprises a bellows.

3. In a brake control apparatus as claimed in claim 1 and a lever interconnecting said pressure sensing means and said actual value signal generating means, means defining a fulcrum upon which said lever is pivoted, and means for displacing said fulcrum in response to the load on the vehicle.

4. In a brake control apparatus as claimed in claim 1 and means including a throttle and connected to the output of said comparator means for connecting said throttle in the supply line to said brake cylinder at a predetermined difference between the comparison of said reference and actual value signals to throttle the introduction of pressure medium to or to throttle the venting of pressure medium from said brake cylinder.

5. In a brake control apparatus as claimed in claim 1 wherein said pressure responsive means comprises a coded member and a scanner to scan said coded member.

* * * * *